United States Patent [19]

Prud'homme

[11] Patent Number: 5,332,067
[45] Date of Patent: Jul. 26, 1994

[54] DISK-BRAKE PAD DEVICE ESPECIALLY WITH A CARBON-CARBON LINING

[75] Inventor: Guy Prud'homme, Ste Foy-les-Lyon, France

[73] Assignee: Carbone Industrie, Bagnolet Cedex, France

[21] Appl. No.: 58,041

[22] Filed: May 7, 1993

Related U.S. Application Data

[63] Continuation of Ser. No. 773,445, Oct. 9, 1991, abandoned.

[30] Foreign Application Priority Data

Jun. 28, 1991 [FR] France .................. 91 08079

[51] Int. Cl.$^5$ .................. F16D 65/00; F16D 65/10
[52] U.S. Cl. .................. 188/73.1; 188/251 A; 188/250 B; 188/264 G
[58] Field of Search .............. 188/264 G, 250 B, 73.1, 188/73.36, 73.37, 71.6, 251 A, 251 M

[56] References Cited

U.S. PATENT DOCUMENTS

| | | |
|---|---|---|
| 2,806,570 | 9/1957 | Markus . |
| 3,477,551 | 11/1969 | Beuchle et al. ............ 188/250 B |
| 3,503,475 | 3/1970 | Mione ...................... 188/264 G |
| 3,848,708 | 11/1974 | Noguchi ................... 188/250 B |
| 4,051,930 | 10/1977 | Masclet .................... 188/251 A |
| 4,572,336 | 2/1986 | Smith et al. .............. 188/264 G |
| 4,581,985 | 4/1986 | Villata ....................... 188/264 G |
| 4,613,021 | 9/1986 | Lacombe et al. ......... 188/251 A |
| 4,775,036 | 10/1988 | Harrison .................. 188/73.1 |
| 4,836,339 | 6/1989 | Kobayashi et al. ........ 188/264 G |
| 4,907,677 | 3/1990 | Yamashita et al. ....... 188/251 M |
| 4,995,482 | 2/1991 | Kobayashi ................ 188/73.1 |

FOREIGN PATENT DOCUMENTS

| | | | |
|---|---|---|---|
| 138081 | 4/1985 | European Pat. Off. ......... 188/73.1 |
| 6601785 | 11/1967 | Fed. Rep. of Germany . |
| 1555683 | 12/1969 | Fed. Rep. of Germany . |
| 156731 | 9/1983 | Japan ........................ 188/264 G |
| 193942 | 11/1983 | Japan ........................ 188/264 G |
| 1207327 | 9/1970 | United Kingdom ........ 188/71.6 |
| 2127918 | 4/1984 | United Kingdom . |

Primary Examiner—Mark T. Le
Assistant Examiner—Kevin D. Rutherford
Attorney, Agent, or Firm—Sughrue, Mion, Zinn, Macpeak & Seas

[57] ABSTRACT

A disk-brake pad device includes a carbon-carbon lining pad. The disk-brake pad device attaches the pad to the caliper. At least one pad-positioning surface of the caliper has merging therefrom at least one pad-actuating piston. A first plate element (1) of heat-insulating material, called a screen element, is located against the positioning surface. At least one second element (2) of heat-insulating material, called a spacer element, of adequate thickness, having reduced frontal contacts is located against the first element (1). A carbon-carbon lining pad (3) of high-temperature friction material is located against the second element (2). The first element (1) and/or the second element (2) acts to retain the lining pad (3) and to fix the first element and/or the second element to the caliper.

2 Claims, 6 Drawing Sheets

5,332,067

DISK-BRAKE PAD DEVICE ESPECIALLY WITH A CARBON-CARBON LINING

This is a continuation of application Ser. No. 07/773,445 filed Oct. 9, 1991, now abandoned.

FIELD OF THE INVENTION

The present invention relates to a lining pad of high-temperature friction material, especially of carbon-carbon, for disk-brakes, for mounting on an ordinary caliper having attachment means for attaching the pad to the caliper, and at least one pad-positioning surface, in which there emerges at least one pad-actuating piston.

BACKGROUND OF THE INVENTION

Replacement of conventional cast iron disk-brakes with organic lining pads by their carbon-carbon equivalents creates a major difficulty in relation to the caliper, especially in wheeled vehicles. There are actually two problems:

The first relates to fixing the pad on the caliper. Since the way organic lining pads are made is very different from the way carbon-carbon pads are made, it is impossible to manufacture a carbon-carbon pad with the same structure as its organic equivalent. As a general rule, organic linings are molded on a metal plate (called a backplate) having means for fixing the pad. An identical carbon-carbon pad would require special processing.

The second problem relates to the thermal insulation of the caliper. For the same application, a carbon-carbon pad has a much higher operating temperature than its organic analog. Insulation is thus necessary to protect the caliper from excessive temperatures, which could lead in particular to the problem of a vapor lock affecting the caliper-actuating fluid.

For these reasons the usual caliper is replaced in practice by a special caliper designed for carbon-carbon lining pads and disks, especially in racing vehicles.

In order to effect the insulation, one such known caliper comprises insulating titanium or asbestos rings fitted on the ends of the pistons (or even pistons made entirely of titanium) and support lugs, likewise of titanium, mounted on the caliper for retaining the lining laterally.

Replacement of the original caliper by a different design of this type results in high installation costs for these brakes, which are more efficient than conventional brakes.

SUMMARY OF THE INVENTION

In order to overcome this problem, according to the present invention the pad device comprises:

a first plate element of heat-insulating material, called a screen element, for location against the positioning surface, at least one second element of heat-insulating material, called a spacer element, of adequate thickness, with reduced frontal contacts and located against the first element, and a lining pad of high-temperature friction material, especially a carbon-carbon lining, located against the second element, the first element and/or the second element comprising retaining means for retaining the lining pad and fixing means cooperating with the attachment means of the caliper.

This device has numerous advantages.

The lining pad can be of a particularly simple shape. As will be seen below, the elements associated with this lining pad are easy to make. They can be formed by stamping and bending.

For this reason the cost price is minimized, no modification of the caliper being necessary and any processing of the lining being particularly simplified.

Moreover, since the elements associated with the lining are essential for mounting it, illegal mounting of carbon-carbon lining pads, without taking necessary insulation precautions, is avoided.

The device in accordance with the invention thus allows the lining pad to be fixed with simultaneous provision of the heat insulation needed for linings of the carbon-carbon type operating at high temperatures.

Because of the design with two interposed elements, the contact surfaces are relatively numerous, thus improving the insulation by means of thermal contact resistance. Furthermore the contact surfaces are of minimal area, thus reducing the heat exchange.

In a preferred embodiment the screen element is a plate with lateral edges bent up at right angles.

In this manner the screen element ensures insulation between the caliper and the lateral supports of the lining pad by contact resistance, in addition to its function of screening heat radiation to the positioning surface. It is possible to use several thicknesses of sheet metal between the caliper and the supports of the lining pad, in order to multiply the contact resistance.

The spacer element is preferably formed by tongues so shaped that their major parts are sandwiched between the screen element and the lining pad opposite the piston or pistons.

Reduced surface contact is thus established both between the lining pad and spacer element and between the screen element and the spacer element. Moreover, these tongues are shaped to ensure good stability of the pistons, having regard to the pressure of the actuating fluid. Furthermore the spacer element is of sufficient thickness to ensure convection cooling of the rear surface of the lining pad.

The device may also possess one or more of the following features:

The screen element and the spacer element are fixedly attached to one another.

The fixing means for fixing on the caliper are carried by the spacer element.

The fixing means for fixing on the caliper are carried by the screen element.

The means for retaining the lining pad are formed by bent tongues fixedly attached to the screen element.

The means for retaining the lining pad are formed by ribs fixedly attached to the spacer element.

The invention is explained in more detail below with reference to drawings showing embodiments only.

DESCRIPTION OF THE PREFERRED EMBODIMENTS

Figure 1:
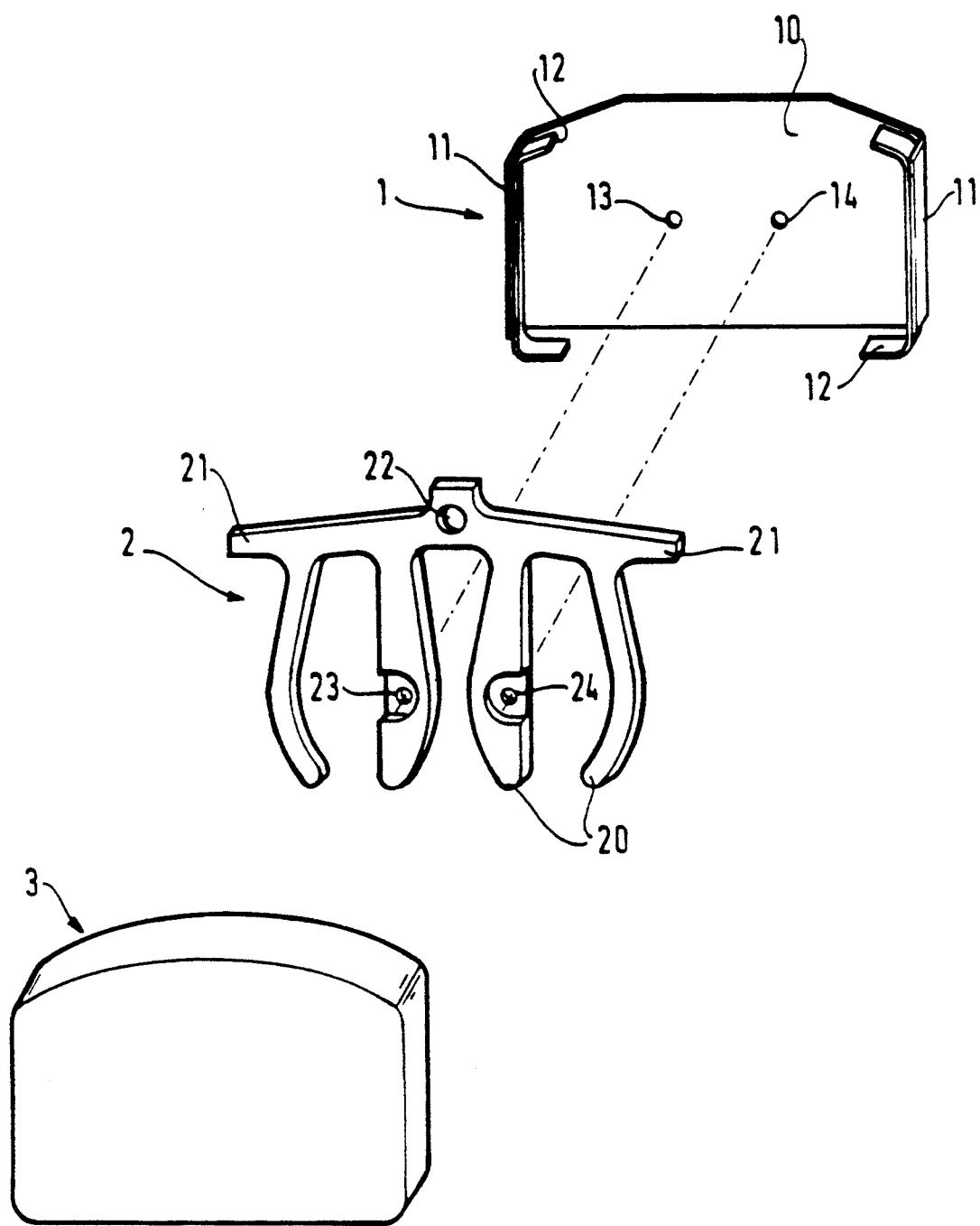
FIG. 1 is a perspective view of a first embodiment of a device of the invention.

In a preferred first embodiment of the invention, the device comprises a screen element 1, a spacer element 2 and a lining carbon-carbon pad 3, such as are shown in FIG. 1.

The screen element 1 is constituted by a plate 10 of shape and dimensions such that it covers the pad-positioning surface.

This plate 10 has lateral edges 11 bent up at right angles. Tongues 12 are fixedly attached to the plate 10. They may for example be fixed by welding or formed by bending.

The spacer element 2 is formed by tongues 20 so shaped that their major parts are sandwiched between the screen element 1 and lining pad 3 opposite the pistons of the caliper. It further comprises fixing means or lugs 21 and 22 cooperating with the attachment means of the caliper. In one embodiment, the caliper is provided with shoulders on which the lugs 21 rest and with a pin fitted into the hole 22.

The screen element 1 and the spacer element 2 are fixedly attached to each other by riveting through the holes 13, 14, 23, and 24. Flats are provided around the holes 23 and 24 of the spacer element 2, so that the rivets do not project above the surface of the spacer element 2, avoiding any interference with the lining pad 3. At the back of the plate 10, the rivets may project, being received in recesses in the pistons.

The lining pad 3, of particularly simple shape, fits between and is retained by the tongues 12 of the screen element 1.

Figure 2:
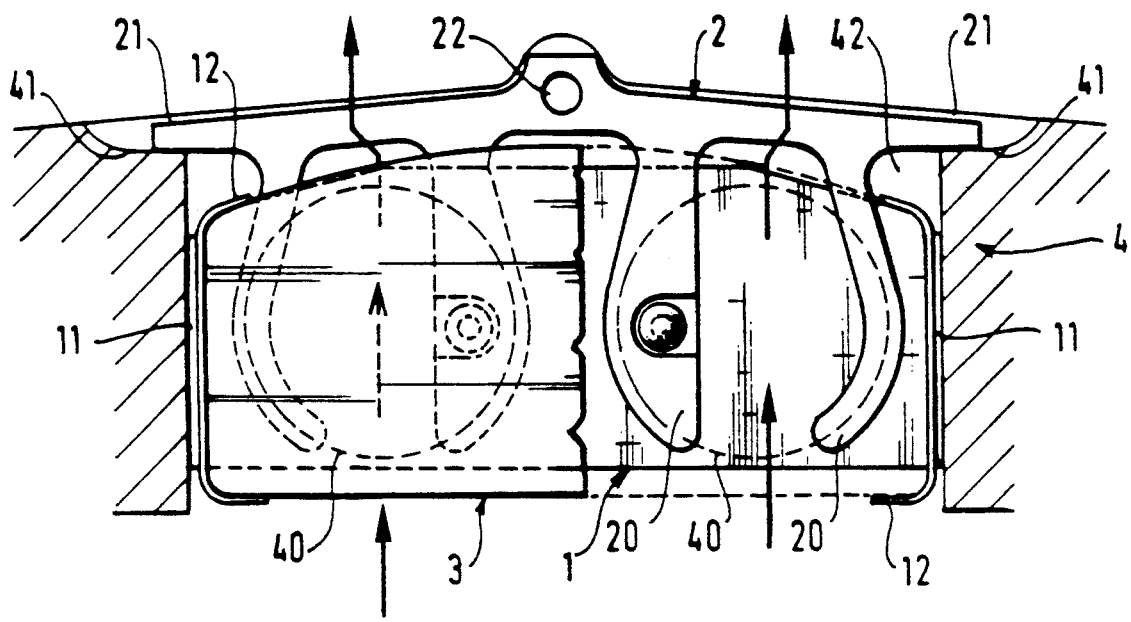
FIGS. 2 and 3 are front and top views, respectively of the device positioned in a disk-brake caliper.
Figure 3:
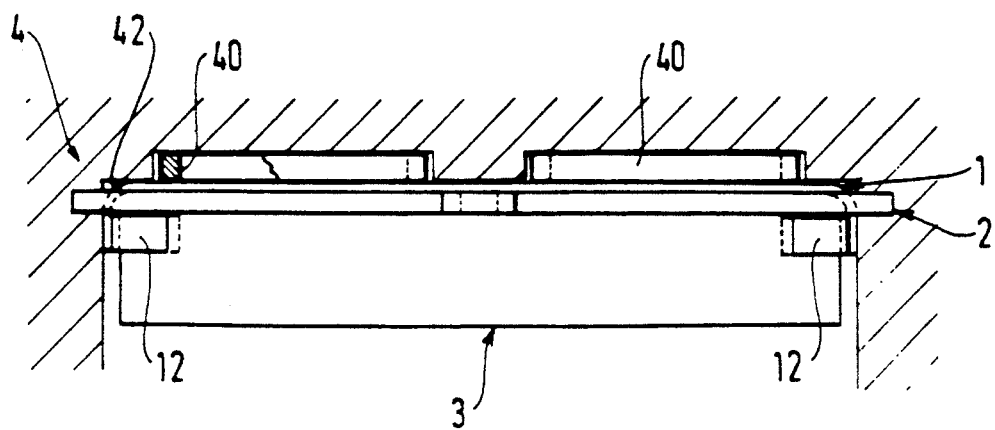

FIGS. 2 and 3 show the device described above positioned in a caliper 4. Two pistons 40 with recessed heads emerge in the positioning surface 42. The fixing and insulating assembly for the lining pad, constituted by the screen element 1 and the spacer element 2, fixedly united by rivets, is positioned on this surface.

The assembly is retained by engagement of the lugs 21 of the spacer element 2 on the shoulders 41 of the caliper 4 and by fitting a pin in the hole 22 of the spacer element 2 and corresponding holes of the caliper. The lining pad 3 is placed against this assembly and retained by the tongues 12 of the screen element 1.

The screen element 1 and the spacer element 2 are both made from a heat-insulating material. They may be of refractory stainless steel, of titanium, or of a ceramic or metal coated with ceramic.

The two elements may equally be made from a single machined part.

The screen element 1 acts as a screen against heat radiation and its bent up edges 11 insulate the sides of the seat in the caliper 4.

Supplementary contacts are obtained by virtue of the spacer element 2, enhancing the insulation. These contacts are however minimized in area on account of their cut-out shape. The spacer element may moreover have machined flats of reduced thickness so that the contact surfaces are present only over the pistons.

Weakened regions, of saw-line type, may also be provided in the spacer element 2 in order to give it some ability to deform in flatness and avoid any play in the assembly caused by possible lack of flatness.

Finally, air can circulate between the arms 20, because they are thick enough, facilitating cooling. It should be noted that, in this first embodiment, cooling air can flow between the screen element 1 and the lining pad 3 from bottom to top or conversely, thus ensuring cooling of the said lining pad by convection.

Figure 4:
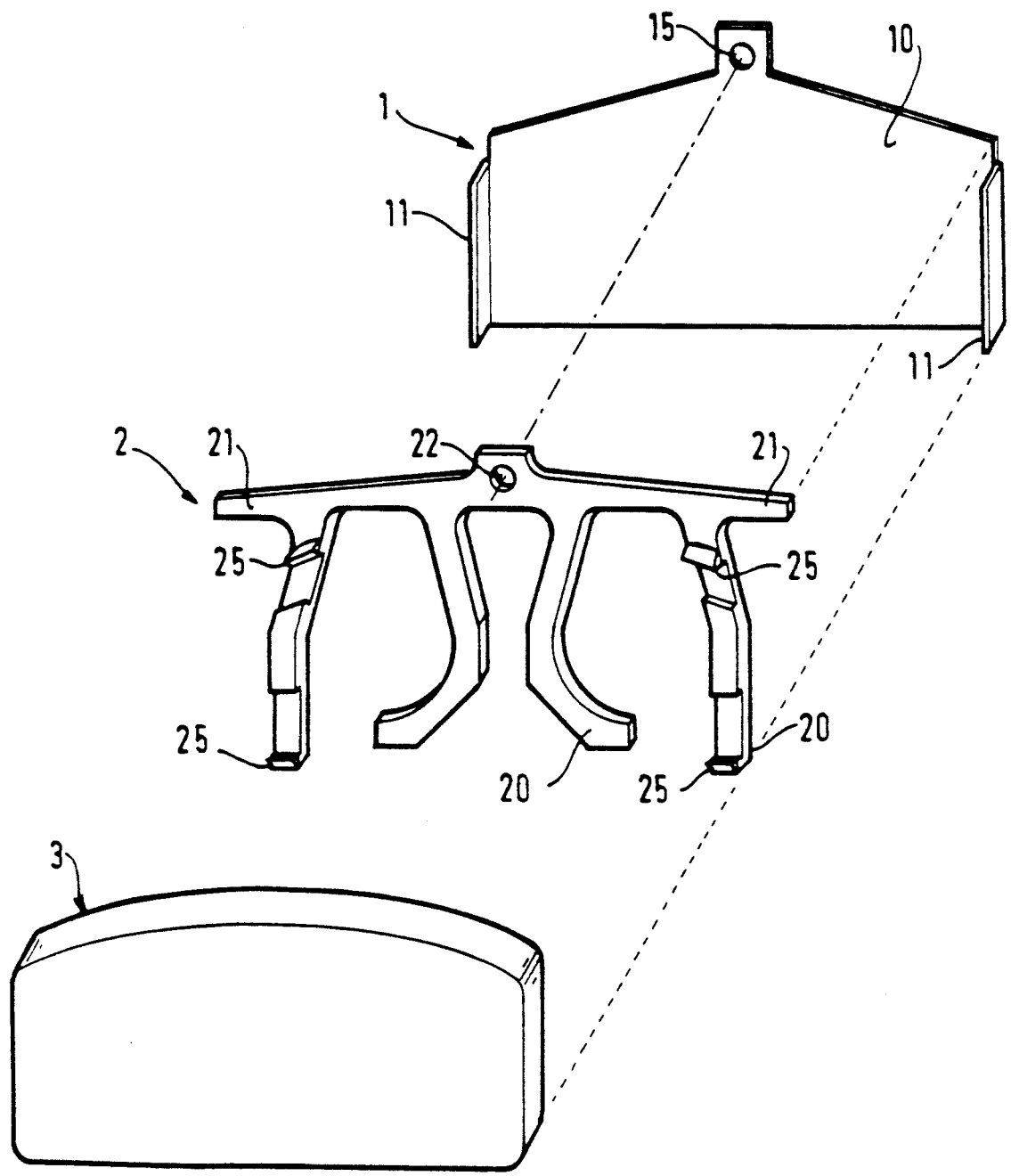
FIG. 4 is a perspective view of a second embodiment of a device which can be mounted on an identical caliper.

FIG. 4 shows another embodiment of the device for the same type of caliper.

The screen element 1 is formed by a plate 10 with bent up edges 11. It likewise has a hole 15 constituting fixing means cooperating with the attachment means of the caliper.

The spacer element 2 is formed in a manner generally like that shown in FIG. 1, with the tongues 20. It likewise comprises lugs 21 and a hole 22 forming fixing means cooperating with the attachment means of the caliper.

However the means for retaining the lining pad 3 are here on the spacer element 2. They are formed by ribs 25 made by welding or machining for example.

The assembly is retained on the caliper by engaging the lugs 21 on the shoulders of the caliper and by fitting the pin in the holes 15 and 22, the screen element 1 and the spacer element 2 not being fixedly attached directly to one another in this embodiment.

Figure 5:
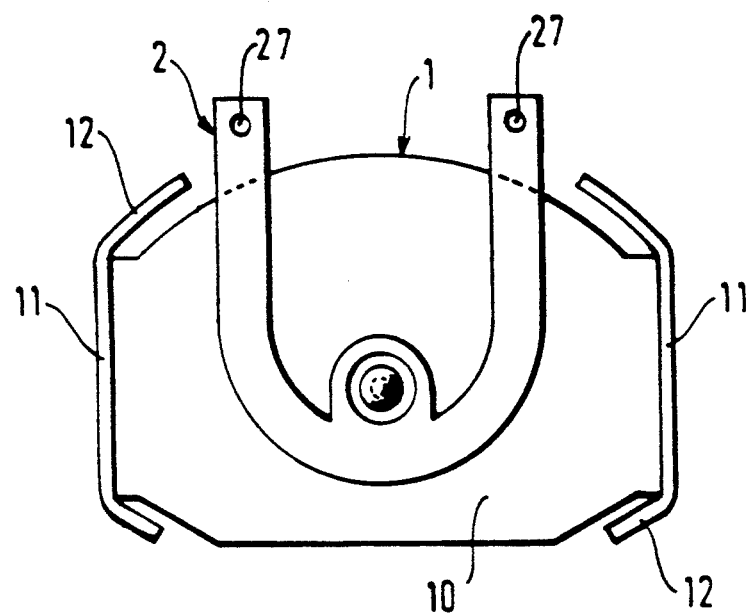
FIGS. 5 to 10 are front and top views of variants of the device of the invention corresponding to various types of caliper.
Figure 6:
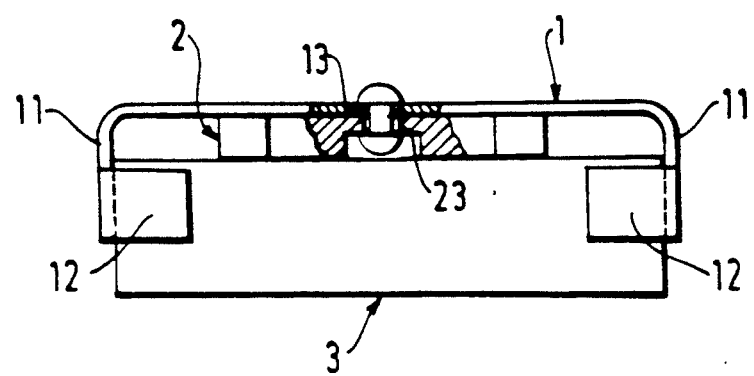

FIGS. 5 and 6 show a device of the invention adapted to be fitted in a caliper with only one lining pad piston and with attachment means formed by pins fitted into holes 27 of the spacer element 2. The lining pad 3 is not shown in FIG. 5.

The spacer element 2 is constituted by a U-shaped bar, riveted to the plate 10 through holes 13, 23 formed in the plate 10 and the spacer element 2.

Figure 7:
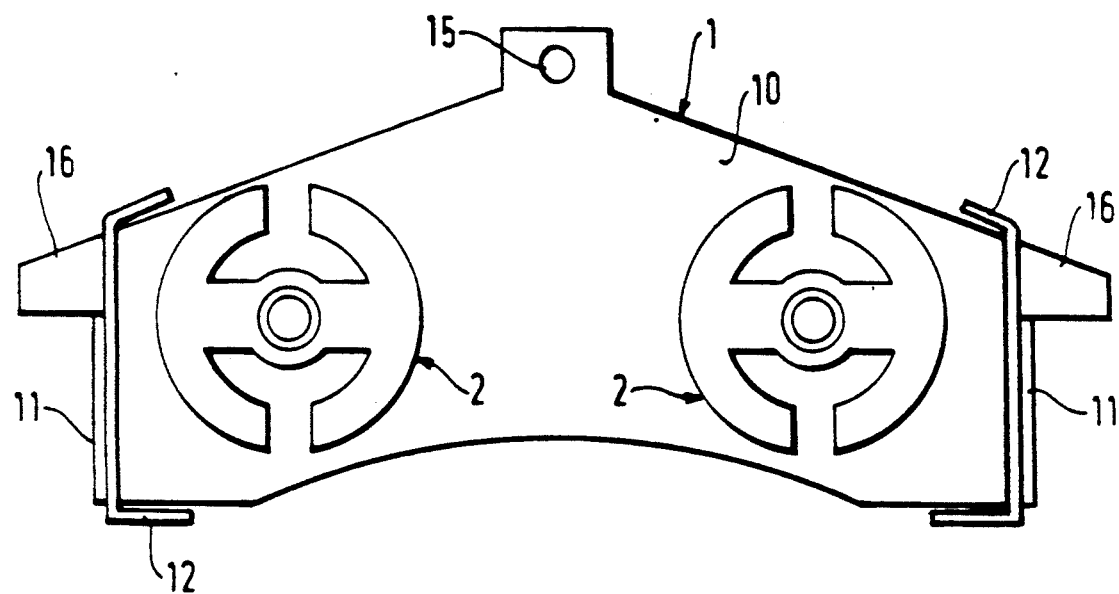
Figure 8:
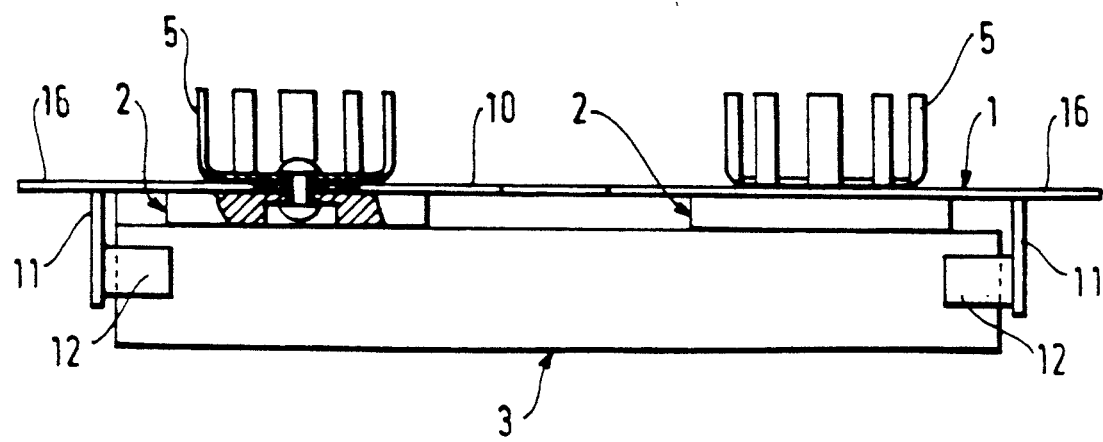

FIGS. 7 and 8 show a device of the invention for a caliper with two lining pad pistons and with supplementary fixing elements 5 for snapping into the recessed heads of the pistons.

Fixing to the caliper is likewise effected in this arrangement by engaging lugs 16 formed on the screen element 1 and by means of a pin fitted into the hole 15 of this element 1.

There are two spacer elements 2, formed from bars of semi-circular shape. They are fitted opposite the pistons and are riveted to the plate 10, the rivets also forming the attachment to the fixing elements 5.

Figure 9:
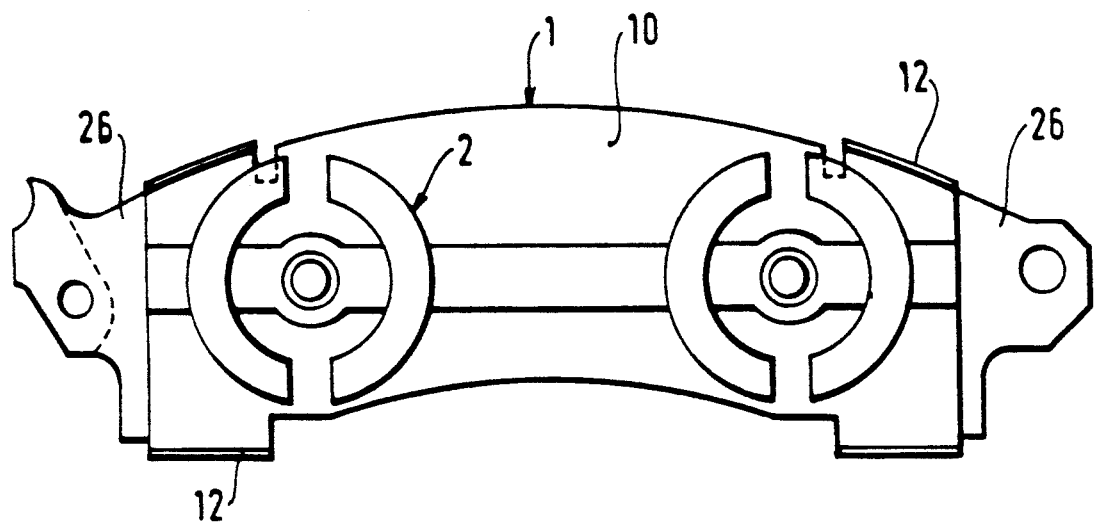
Figure 10:
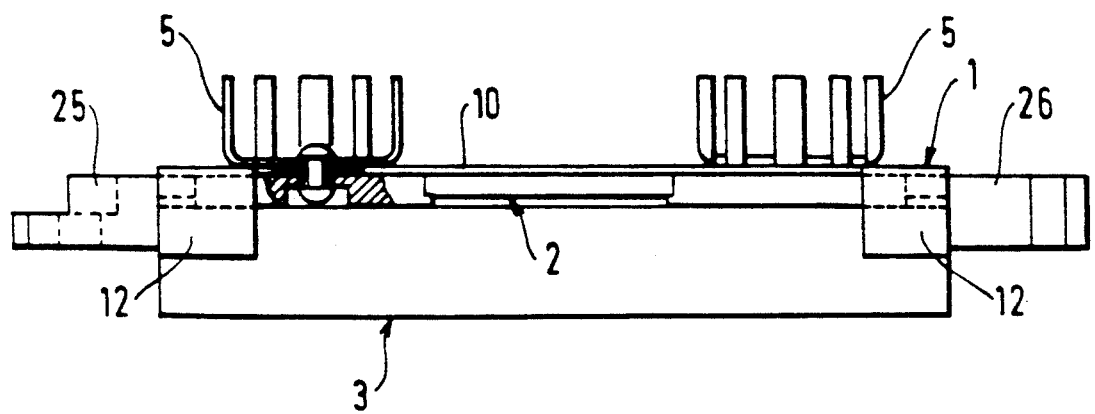

FIGS. 9 and 10 show a device of the invention for a caliper with two pad pistons and with supplementary fixing elements 5 for snapping into the recessed heads of the pistons. Such calipers are fitted in mass-produced private cars, for example.

In this device, fixing to the caliper is likewise by lateral pinning, for which the spacer element 2 is provided with two lateral lugs 26, each with a hole. This spacer element 2 is formed by a horizontal bar and semi-circular bars over the pistons. The central bar is machined off to a flat to provide a space between the bar and the lining pad 3.

I claim:

1. In a disk-brake pad device including a lining pad for mounting on a caliper and having at least one lining pad-positioning surface, from which emerges at least one lining pad-actuating piston, a front face of the piston forming a pressure face, the improvement comprising:

a first plate element (1) of heat-insulating material, called a screen element, for location against the caliper positioning surface, at least one second element (2) of heat-insulating material, called a spacer element, of adequate thickness, with reduce front contacts and located against the first element (1), and wherein said first lining pad is a carbon-carbon high-temperature friction material lining pad (3), said first element (1) comprising retaining means for retaining the lining pad (3), and at least one of the first element (1) and the second element (2) comprising fixing means engaging the pad device with the caliper, said spacer element (2) being formed by small arms 20 shaped such that major parts thereof are sandwiched between the first element (1) and the lining pad (3), opposite the pressure face of said at least one piston, acting on the first element (1), and said retaining means comprising bent tongues (12) fixedly attached to the first element (1), and supporting said lining pad (3) between said tongues (12) and against the face of said arms of said second element without rigid attachment between the lining pad and said second element.

2. In a disk-brake pad device including a lining pad for mounting on a caliper and having at least one pad-positioning surface, from which emerges at least one lining pad-actuating piston, a front face of the piston forming a pressure face, the improvement comprising:

a first plate element (1) of heat-insulating material, called a screen element, for location against the positioning surface, at least one second element (2) of heat-insulating material, called a spacer element, of adequate thickness, with reduced frontal contacts and located against the first element (1), said lining pad is carbon-carbon high-temperature friction material lining pad (3), said second element (2) comprising retaining means for retaining the lining pad (3), and at least one of the first element (1) and the second element (2) comprising fixing means for engaging the pad device with the caliper, said spacer element (2) being formed by small arms (20) shaped such that major parts thereof are sandwiched between the first element (1) and the lining pad (3), opposite the pressure face of said at least one piston, acting on the first element (1), and said retaining means comprising ribs (25) fixedly attached to said small arms of said second element (2), said lining pad (3) being supported between said ribs (25) against the face of said arms of said second element without rigid attachment between the lining pad and said second element.

* * * * *